(12) United States Patent
Marino et al.

(10) Patent No.: US 11,142,078 B2
(45) Date of Patent: Oct. 12, 2021

(54) ELECTRIC DRIVE SYSTEM OF A HYBRID OR ELECTRIC VEHICLE

(71) Applicant: FERRARI S.p.A., Modena (IT)

(72) Inventors: Luigi Marino, Catania (IT); Davide Ferrara, Turin (IT); Ugo Sitta, Renazzo Cento (IT); Elena Ligabue, Serramazzoni (IT)

(73) Assignee: FERRARI S.P.A., Modena (IT)

( * ) Notice: Subject to any disclaimer, the term of this patent is extended or adjusted under 35 U.S.C. 154(b) by 246 days.

(21) Appl. No.: 16/200,741

(22) Filed: Nov. 27, 2018

(65) Prior Publication Data

US 2019/0160968 A1 May 30, 2019

(30) Foreign Application Priority Data

Nov. 28, 2017 (IT) .......................... 102017000136779

(51) Int. Cl.
  *B60W 10/26* (2006.01)
  *B60L 58/21* (2019.01)
  (Continued)

(52) U.S. Cl.
  CPC ............... *B60L 50/61* (2019.02); *B60K 6/52* (2013.01); *B60L 7/14* (2013.01); *B60L 15/2045* (2013.01); *B60L 50/15* (2019.02); *B60L 50/51* (2019.02); *B60L 53/24* (2019.02); *B60L 58/21* (2019.02); *B60W 10/26* (2013.01); *H02P 25/16* (2013.01);
  (Continued)

(58) Field of Classification Search
  None
  See application file for complete search history.

(56) References Cited

U.S. PATENT DOCUMENTS

2010/0133025 A1  6/2010  Flett
2014/0239869 A1*  8/2014  Gorka .................. B60L 50/51
                                                    318/496
(Continued)

FOREIGN PATENT DOCUMENTS

FR    2866279 A1    8/2005
KR    100900281 B1  5/2009

OTHER PUBLICATIONS

Wu et al., "Powertrain Architectures of Electrified Vehicles: Review, Classification and Comparison", Journal of the Franklin Institute, vol. 352, Iss. 2, Feb. 2015, pp. 425-448. (Year: 2015).*

(Continued)

*Primary Examiner* — Todd Melton
(74) *Attorney, Agent, or Firm* — Cantor Colburn LLP

(57) ABSTRACT

Electric drive system of a hybrid or electric vehicle comprising at least a first and a second battery pack, said first battery pack being formed by a first plurality of equal cells, wherein a cell of said first plurality of cells identifies a first predetermined C-rate coefficient (power/capacity) and said second battery pack being formed by a second plurality of equal cells, wherein a cell of said first plurality of cells identifies a second predetermined C-rate coefficient (power/capacity) higher than said first predetermined coefficient, and wherein the drive system comprises at least a first and a second set of electromagnetic induction windings, respectively independently powered by said first and second battery pack by means of relative first and second inverter.

15 Claims, 4 Drawing Sheets

(51) Int. Cl.
    *B60L 50/61*        (2019.01)
    *B60L 50/15*        (2019.01)
    *B60L 53/24*        (2019.01)
    *B60K 6/52*         (2007.10)
    *B60L 7/14*         (2006.01)
    *B60L 50/51*        (2019.01)
    *B60L 15/20*        (2006.01)
    *H02P 25/16*        (2006.01)

(52) U.S. Cl.
    CPC ....... *B60L 2220/42* (2013.01); *B60L 2220/54* (2013.01); *B60L 2260/26* (2013.01); *B60W 2510/085* (2013.01); *B60W 2510/244* (2013.01)

(56) References Cited

U.S. PATENT DOCUMENTS

2014/0358350 A1   12/2014  Schmidt et al.
2014/0377596 A1*  12/2014  Dhar ................ H01M 10/0525
                                                                                         429/9
2016/0006276 A1    1/2016  Mikulec et al.

OTHER PUBLICATIONS

Batteryuniversity.com: "BU-302: Series and Parallel Battery Configurations", Nov. 21, 2017, pp. 1-4, XP002793672, retrieved from the internet: URL:https://batteryuniversity.com/learn/article/serial_and_parallel_battery_configurations (retrieved on Aug. 20, 2019].
Search Report issued in EP application No. 18208447.5-1205 dated Sep. 16, 2019; 14 pages.
International Search Report and Written Opinion for IT Application No. 201700136779 completed Jul. 13, 2018 (13 pages).
Office Action issued in European Patent Application No. 18 208 447.5-1205 dated Nov. 10, 2020; 4 pages.

* cited by examiner

ELECTRIC DRIVE SYSTEM OF A HYBRID OR ELECTRIC VEHICLE

CROSS-REFERENCE TO RELATED APPLICATIONS

This Patent application claims priority from Italian Patent Application No. 102017000136779 filed on Nov. 28, 2017, the disclosure of which is incorporated by reference.

FIELD OF APPLICATION OF THE INVENTION

The present invention relates to the field of the electric drive of a hybrid or electric vehicle. Therefore, the electric drive system described below can be the only on-board drive system of a vehicle or it can be combined with an internal combustion engine.

STATE OF THE ART

Electric or hybrid vehicles are generally equipped with a battery pack. This is made up of strings of equal cells.

Each cell is characterized by an energy storage capacity and by a specific power.

Some cells are more predisposed to supply great power but are characterized by a small storage capacity and other cells, on the contrary, are able to store a large amount of energy but are not able to supply a great power.

Starting from this second category of batteries, since the voltage of the electric drive system is predetermined, a great specific power can be obtained by connecting in parallel two or more battery strings, with the consequence of obtaining a much higher storage capacity than the one requested. This involves allocating a considerable weight and volume on board the vehicle.

This is intolerable in sports cars.

The batteries with the highest specific power, on the other hand, have a limited storage capacity and it is necessary to connect two or more strings in parallel to reach predetermined autonomy specifications in a purely electric mode. Also in this case, the volume and weight of the battery pack would be intolerable for a sports car and, moreover, the deliverable current would be so high that it should have quite high safety standards.

The ratio between deliverable power and storage capacity is generally referred to as "C-rate". Except in exceptional cases, it is not easy to find on the market cells that have exactly the C-rate corresponding to the design specifications of a hybrid or electric vehicle, especially when it is a sport vehicle that must guarantee high performances and corresponding safety standards.

SUMMARY OF THE INVENTION

The object of the present invention is to indicate an electric drive system of a hybrid or electric vehicle, which is easily adaptable to batteries available on the market.

The basic idea of the present invention is to provide at least a first and a second battery pack, each battery pack being formed by cells, equal between each other, with the characteristic C-rate of the cells of the first battery pack different from the characteristic C-rate of the cells of the second battery pack, and wherein the drive system comprises a first and a second set of electromagnetic induction windings, respectively independently powered by said first and second battery packs through a respective first and second inverter.

"Magnetic induction windings" means that the windings are wound on a ferromagnetic core in a manner known per se to generate a magnetic field in order to obtain a rotation of a rotor. For the sake of brevity, in the following, they will simply be referred to as "windings".

"Independently" means that the voltages and currents generated by the first inverter may be different from those generated by the second inverter.

As better explained hereinafter, if two windings are wound on the same stator, the driving frequency between the two windings is preferably the same.

Advantageously, the peculiar characteristics of the at least two battery packs can be exploited. Therefore, the first inverter relative to the battery pack having a lower C-rate is activated substantially always, whereas when the required electric power is greater than the one deliverable by the first battery pack, it is activated the second inverter relative to a battery pack having a higher C-rate, which supplies the first inverter up to the maximum total deliverable power.

"Lower" or "higher" relative to the C-rate of the battery packs mean comparative attributes between the C-rates of the battery packs with which the present drive system is provided.

This activation order can also be maintained during the so-called regenerative braking, i.e. when the kinetic energy of the vehicle is converted into electric energy and stored in the at least two battery packs. Since the energy flows in such conditions can be very intense, it is preferably provided a first recharge of the first battery pack having a lower C-rate and then the second battery pack having a higher C-rate, when the transiting power exceeds the tolerable threshold of the first battery pack.

During a cycle of use of a vehicle, it is not possible to predict the driving style of the driver. Therefore, according to a preferred variant of the invention, in order to avoid discharging the first battery pack by limiting the storage capacity during a sudden regenerative braking or in order to avoid discharging the second battery pack, thus compromising the performance of the vehicle during a sudden acceleration, it is preferable to balance the discharging and recharging of at least two battery packs. In this way, the second inverter can be activated even when the power to be delivered is lower than the maximum power that can be supplied by the first battery pack and even while the first inverter is completely off.

Advantageously, this is equivalent to providing the vehicle with a virtual battery having a C-rate equal to the sum of the single C-rates.

With regard to the electrical implementation, the two sets of windings can:

be wound in the same electric motor and share the same magnetic circuit, or be arranged so that a set is associated with a stator of a first electric motor and the other set is associated with a stator of a second electric motor, wherein said stators are magnetically independent.

If the two sets of windings are wound on distinct and separate ferromagnetic cores of as many electric motors, then also phase and frequency of the respective generated magnetic fields may differ.

If, on the other hand, the two sets of windings are wound on the same ferromagnetic core, then the inverters, while generating independent currents and voltages, guarantee the same frequency and, if possible, the same phase of the respective generated magnetic fields.

For example, the electric motor may be a separately excited synchronous motor or a brushless DC motor, in which two independent sets of stator windings are simultaneously present to generate two rotary magnetic fields that are vectorialized, thus generating a rotary magnetic field that drives the same stator of the electric motor into rotation. Combinations of the solutions described above can also be provided. For example, it can be envisaged the simultaneous presence of a first "double electric motor", namely in which a first and a second winding are wound on a same first stator of the double electric motor and are driven independently of each other, and of a second traditional electric motor, in which a third winding is wound on a relative second stator and driven independently of the first and second windings or in a coordinated way with one of them.

Evidently, the two or more inverters corresponding to the two or more battery packs are synchronized to limit the space-time displacements between the relative generated magnetic fields. Moreover, each of them is able to perform a variable frequency drive of the relative winding.

If there is an angular displacement between the windings of the electric motor relative to the first set with respect to the second set of windings, the corresponding inverters are preferably driven so as to compensate for this angular displacement, thus obtaining an optimal vector composition of the generated magnetic fields.

Each set of windings can have any number of phases. For example, the first set can comprise three phases, while the second set can have five phases, or both can have the same number of phases, e.g. two and two or three and three, etc. . . . . .

Furthermore, the electric motor can have any flow distribution, i.e. the magnetic flow can be radially and/or axially distributed.

The claims describe preferred variants of the invention forming an integral part of the present description.

BRIEF DESCRIPTION OF THE FIGURES

Further objects and advantages of the present invention will become clear from the following detailed description of an embodiment thereof (and its variants) and from the annexed drawings given purely by way of explanatory and non-limiting example, in which.

The same reference numbers and letters in the figures identify the same elements or components.

In the context of the present description, the term "second" component does not imply the presence of a "first" component. These terms are in fact used only for clarity's sake and are not to be meant in a restrictive manner.

DETAILED DESCRIPTION OF EMBODIMENTS

A battery pack must be supposedly sized to store an electric energy of 16 kWh, needing a power of 150 kW.

The C-rate corresponds to 150/16=9.375.

In the hypothesis in which all the cells, regardless of the relative C-rate, have the same nominal voltage (50% of SOC), e.g. 3.68 V, this means that a total storage capacity of about 16 kWh is required.

Supposedly, there is a cell of a first type characterized by a storage capacity of 257 Wh and a power of 1.08 kW and a cell of a second type characterized by a storage capacity of 96 Wh and a power of 2.16 kW.

The first battery expresses a C-rate of 1080/257=4.2 and the second battery expresses a C-rate of 2160/96=22.5.

Two equations with two unknowns are obtained:

$$A*96+B*257=16 \qquad 1)$$

$$A*2.16+B*1.08=150 \qquad 2)$$

A represents the number of cells of the first type, whereas B represents the number of cells of the second type.

The resolution of a system formed by the preceding two equations 1) and 2) identifies the two unknowns A and B, in which A=45 and B=46.

Such two battery packs allow obtaining the desired performance regardless of the availability of cells having that corresponding C-rate.

The method can be summarized by the following steps:
acquisition of a first CT target value of total capacity given by the sum of the capacities of the first and of the second battery pack;
acquisition of a second target value PT of total deliverable power given by the sum of the powers that can be supplied by the first and by the second battery pack;
acquisition of a first capacity value C1 and of a first power value P1 of a cell of the first plurality of cells defining the first pack;
acquisition of a second capacity value C2 and of a second power value P2 of a cell of the second plurality of cells defining the second pack;
calculation of a first numerosity A of said first plurality and of a second numerosity B of said second plurality according to the following system of two equations 1) and 2) in two unknowns A and B:

$$A*C1+B*C2=CT \qquad 1)$$

$$A*P1+B*P2=PT; \qquad 2)$$

Figure 1:
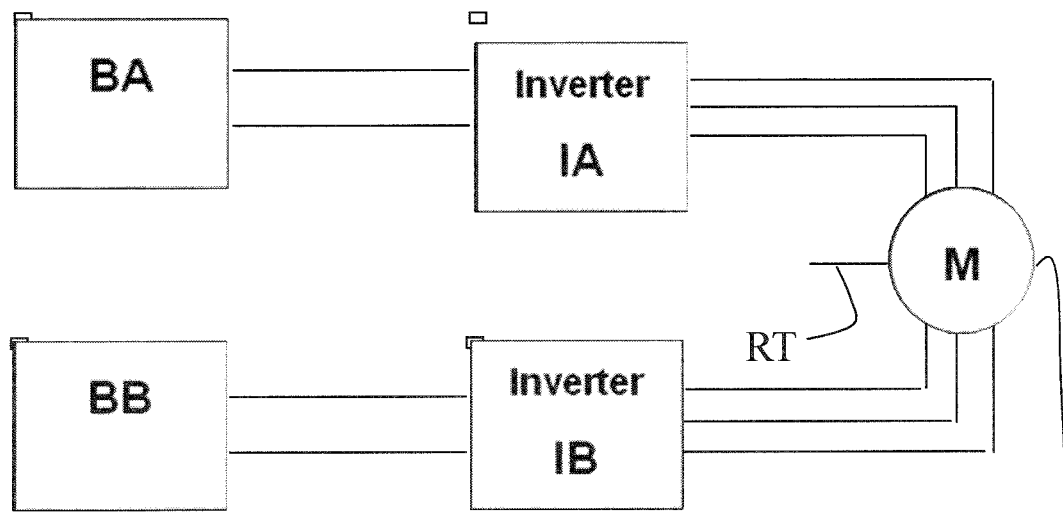
FIG. 1 shows an exemplary scheme of an electric drive system of a hybrid or electric vehicle according to the present invention.
Figure 1A:
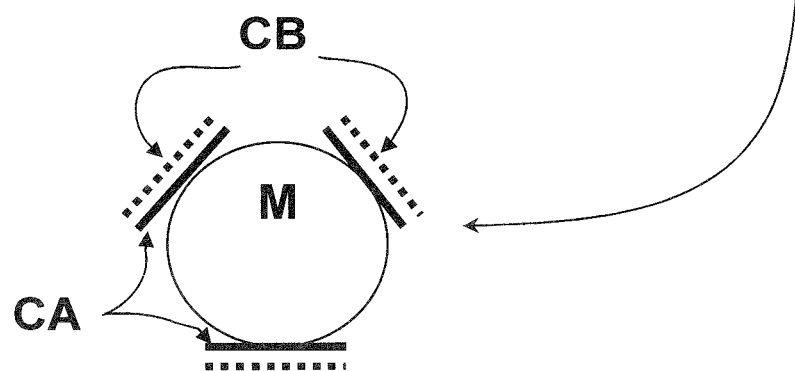
FIG. 1a shows a detail of FIG. 1.

FIG. 1a shows an example of an electric drive system according to a preferred example of the present invention. It is clear that the first battery pack BA is connected to a corresponding inverter IA, which feeds a first set CA of windings wound on a ferromagnetic core of an electric motor M. Moreover, the second battery pack BB is connected to a corresponding separate inverter IB and is separated from the inverter IA to feed a second set CB of windings wound on the same aforementioned magnetic core of an electric motor M.

Preferably, said magnetic core defines a stator of said electric motor M.

Therefore, FIG. 1a schematically shows a single electric motor M with the two sets of windings CA and CB that are wound on it. The fact that the set CB is represented externally with respect to the set CA is not to be considered limiting.

Figure 3A:
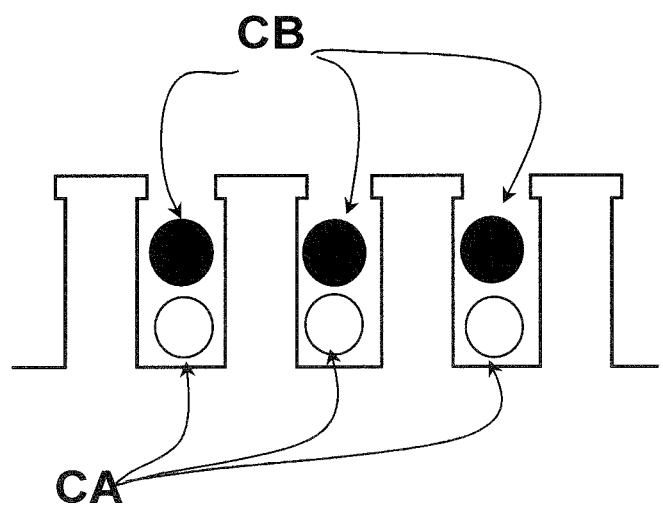
FIGS. 3a and 3b show two different arrangements of sets of windings wound on a same ferromagnetic core.
Figure 3B:
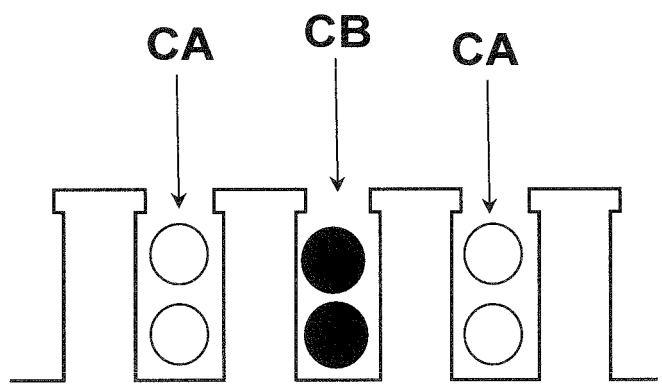

With reference to FIGS. 3a and 3b, a rectified stator is shown. The windings belonging to the two sets CA and CB can share the same slots or alternate in adjacent slots. They can also share the same slots and be arranged so that they are alternately proximal to the air gap (solution not shown).

Since the battery packs are characterized by different powers, the sets of windings can also be sized to support these respective powers. For example, the number of turns, their cross-section and the respective amounts of copper can vary freely between one set of windings and another, in addition to the fact that each set can have a different number of phases. For example, the first set consists of three phases, while the second set consists of four phases. The inverters are configured to generate two respective synchronized magnetic fields, i.e. so that the relative rotary phasors are constantly superposed on top of each other.

FIG. 1 further shows that each inverter is connected to the electric motor M by means of a three-wire line. Also this is not to be considered limiting, since each set of windings CA and CB can have any number of phases.

In the case in which the number of the phases of a set differs from the number of phases of the other set of windings or, despite having the same number of phases, if it were not possible to arrange a first phase of the first set in the same angular position as the first phase of the second set as a whole, as shown in FIG. 3a, the inverters are driven so as to compensate for this structural angular displacement by means of a time displacement of the generated relative rotary magnetic field.

It is now assumed that in the drive system of the present invention the first BA battery pack is formed of cells having a first C-rate, i.e. a ratio between power (instantaneously deliverable energy) and energy storage capacity lower than the second C-rate that characterizes the cells of the second BB battery pack.

According to a preferred method of operation of the present drive system, the first inverter, associated with the first battery pack, is always active delivering all power levels comprised between 0 and a predetermined threshold that is a fraction of the maximum power deliverable by the first battery pack. The second inverter, on the other hand, is activated for supplementing the first inverter when this latter has reached said predetermined threshold. For this reason, this threshold is hereinafter referred to as the "overlap threshold".

For example, said "overlap threshold" can be permanently set to the value 0.95 of the maximum power deliverable by the first battery pack.

Assuming that the driver has a very moderate driving style, it is likely that the first battery pack will run out, leaving the second battery pack fully charged. Since very intense current flows can be generated in abrupt regenerative braking, it is advisable to guarantee a certain capacity in the second battery pack to store them. Therefore, the overlap threshold must be such as to guarantee a certain capacity even in the second battery pack.

The different discharging and recharging dynamics of the two battery packs depends
on the overlap threshold,
on the difference between the total capacities of the battery packs,
on the driver's driving style.

These factors are all interrelated with each other.

The greater the difference between the two overall capacities, the higher the overlap threshold must be, and vice versa, the more similar the capacity of the two battery packs, the lower the overlap threshold must be.

The more aggressive the driving style, the higher the overlap threshold must be to avoid a sudden discharging of the second battery pack and a consequent sudden reduction in the vehicle performance.

It is therefore evident that the overlap threshold can be a function of several variables, among which the difference (or the ratio) between the overall energy storage capacities of the two battery packs and their charging state, which depends on the driving style of the driver.

In other words, the overlap threshold can be continuously varied so as to constantly maintain a predetermined ratio between the charging states of the two battery packs.

Advantageously, during regenerative braking, having the possibility of storing energy in both the battery packs, it is advantageous to continue distributing the available energy between the two battery packs so as to keep said ratio between the charging states unchanged.

It is also advantageous to size the battery packs in such a way as to supply the same rated voltage. This makes also the management of the inverters easier.

Figure 2:
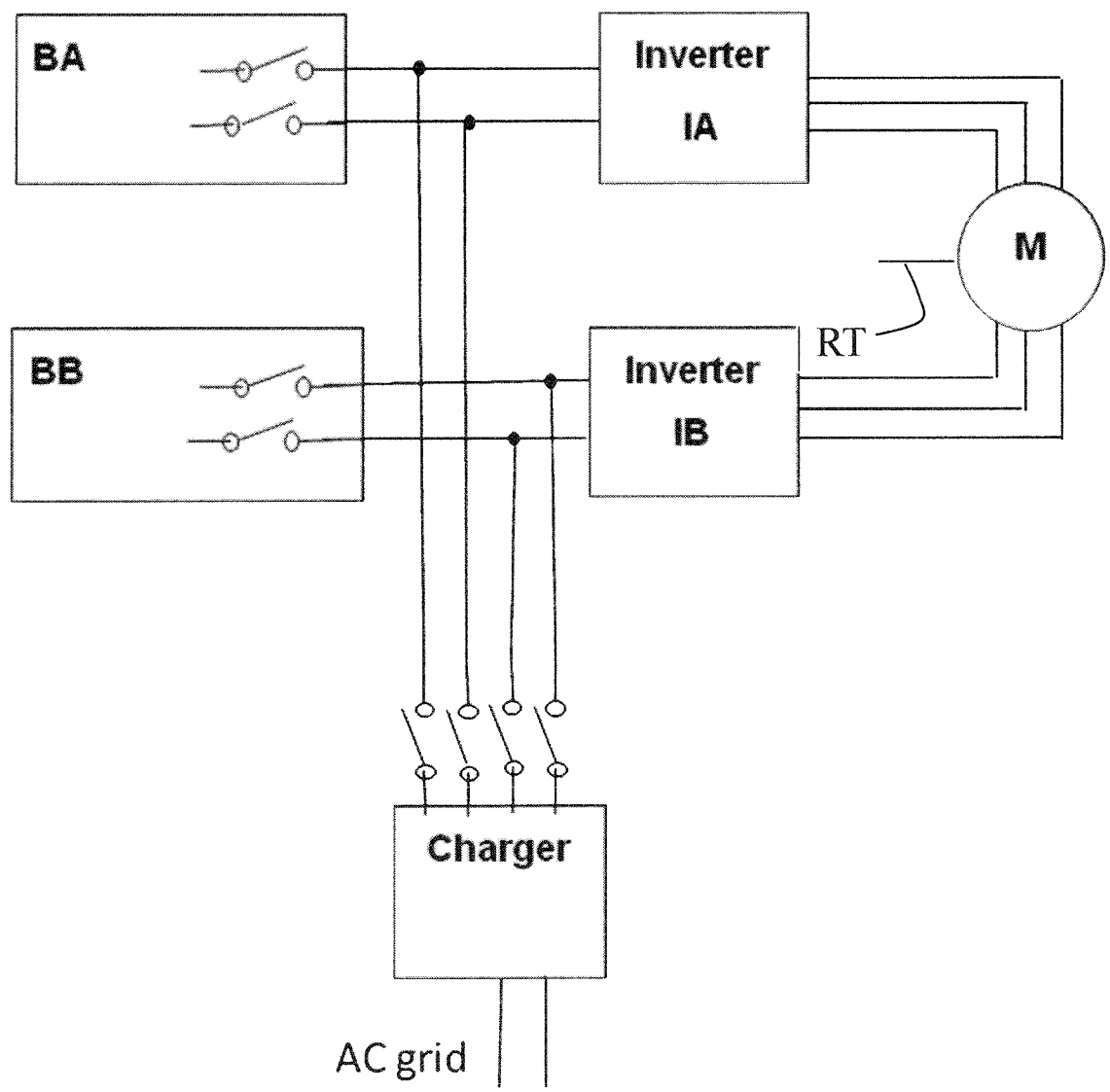
FIG. 2 shows an exemplary diagram of the system of FIG. 1, also showing the recharging section of the relative batteries.

FIG. 2 shows a variant of the diagram of FIG. 1, in which the portion relating to the recharging of the batteries is also evident through a "Charger" power supply connected to an external electric network.

If the two battery packs have the same rated voltage, then the operations of connection and disconnection from the power supply can be carried out directly by the electronics on board the battery packs.

The present invention can be validly applied both to pure electric vehicles, i.e. not equipped with further prime engines with respect to the electric motors supplied by the present drive system, or to hybrid vehicles, namely in combination with an internal combustion engine.

The electric motor may be operatively associated to the same transmission to which the crankshaft of the internal combustion engine is connected or it can be connected to a dedicated transmission. For example, the internal combustion engine is operatively connected to the rear axle of a vehicle, whereas the electric motor M is operatively connected to the front axle of the same vehicle.

According to another preferred variant of the invention, the two sets of windings CA and CB are respectively wound on the ferromagnetic cores of as many different motors EM1 and EM2.

Figure 4:
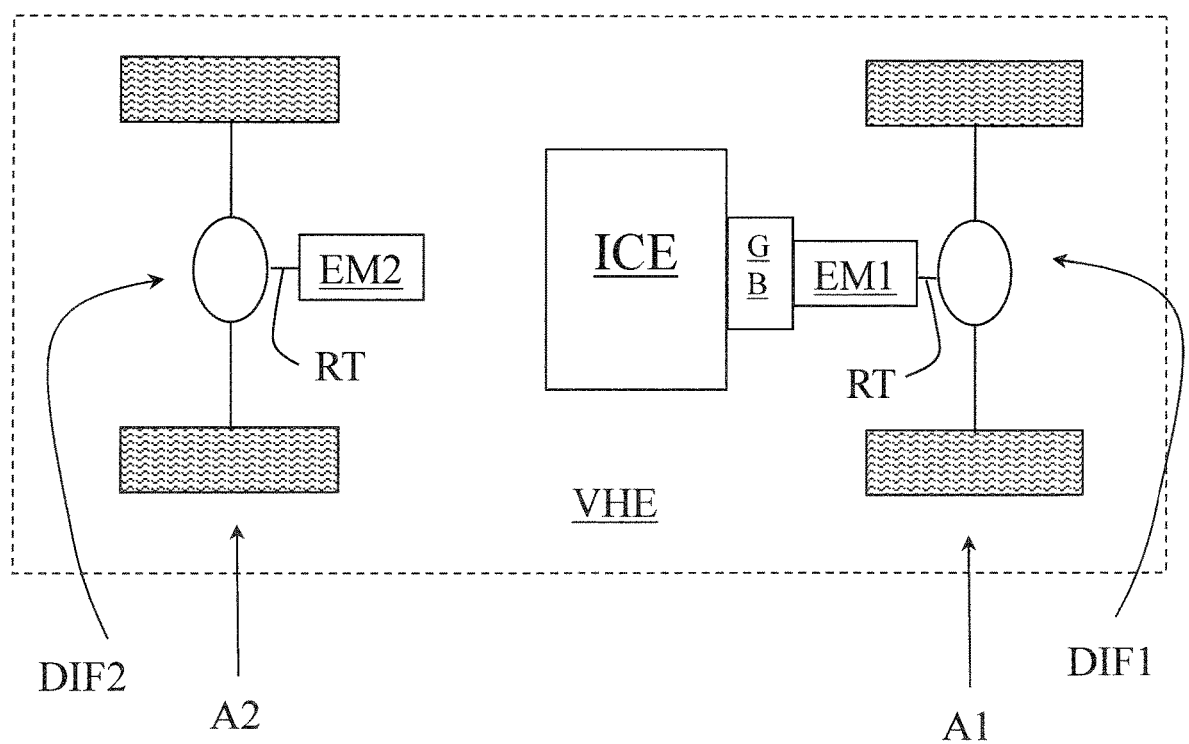
FIG. 4 shows an example of implementation in a hybrid all-wheel drive car.

With reference to FIG. 4, in which a VHE vehicle is schematically shown, the first electric motor EM1 is associated with a first axle A1, while the second electric motor EM2 is associated with a second axle A2.

Optionally, an internal combustion engine ICE is also connected to the second axle, equipped with a relative transmission GB, for example, shared with the second electric motor EM1.

FIG. 4 is schematic and the fact that the transmission GB is shown between the internal combustion engine ICE and the electric motor EM1 does not mean that this latter cannot be arranged between the heat engine and the gearbox GB.

From the configuration shown in FIG. 4 different variants can be obtained, e.g. by associating the first motor EM1 to the first battery pack (not shown) with a C-rate greater than the second battery pack, in turn associated with the second electric motor EM2, or vice versa.

The examples shown here are based on the use of two battery packs, but it is possible to use any number of battery packs made up of cells characterized by a C-rate different from the one of the cells that make up the other battery packs, in which each battery pack has a relative inverter that feeds one and only set of magnetic induction windings, namely its own.

This can be advantageous, for example, when the shape of some batteries is better suited to form a battery pack suitable for being housed in a predetermined vehicle compartment.

The operation of the inverters can be managed by a dedicated processing unit or can be managed by the onboard control unit. The same functionality can also be introduced in the ECU (Engine control unit), which oversees the operation of the internal combustion engine in the case of hybrid vehicles.

The present invention can be advantageously manufactured by means of a computer program, which comprises coding means for carrying out one or more steps of the method, when this program is run on a computer. Therefore, it is intended that the scope of protection extends to said computer program and also to computer readable means comprising a recorded message, said computer readable means comprising program-coding means for carrying out one or more steps of the method when said program is run on a computer.

Modifications to the embodiments of the described non-limiting example are possible without departing from the scope of the present invention, including all equivalent embodiments for a person skilled in the art.

From the above description, the person skilled in the art is able to manufacture the object of the invention without introducing further manufacturing details. The elements and features shown in the various preferred embodiments, including the drawings, may be combined with each other without however departing from the scope of protection of the present application. What has been described in the part relating to the state of the art only requires a better understanding of the invention and does not represent a declaration of existence of what has been described. Moreover, if not specifically excluded in the detailed description, what has been described in the part relating to the state of the art is to be considered as an integral part of the detailed description.

The invention claimed is:

1. An electric drive system of a hybrid or electric vehicle comprising a transmission and at least a first (BA) and a second (BB) battery pack, said first battery pack being formed by a first plurality of cells, equal between each other, wherein one cell of said first plurality of cells identifies a first predetermined C-rate coefficient, namely a first predetermined cell power/capacity ratio, and said second battery pack is formed by a second plurality of cells, equal between each other, wherein one cell of said second plurality of cells identifies a second predetermined C-rate coefficient, namely a second predetermined cell power/capacity ratio greater than said first predetermined C-rate coefficient, and wherein the drive system comprises at least a first (CA) and a second (CB) set of electromagnetic induction windings to cause at least one rotor (RT) connected with said transmission to rotate, respectively independently powered by said first and by said second battery pack via respective first (IA) and second (IB) inverters, wherein the first battery pack (BA) drives the first inverter (IA) and the second battery pack (BB) drives the second inverter (IB), wherein the first inverter is always active delivering all power levels comprised between 0 and a predetermined threshold that is a fraction of a maximum power deliverable by the first battery pack, and the second inverter is activated for supplementing the first inverter when the first battery pack has reached the predetermined threshold.

2. The system according to claim 1, wherein said first (CA) and said second (CB) electric induction windings are wound on a single ferromagnetic core of a single electric motor (M), sharing the same magnetic circuit, or are wound on two independent ferromagnetic cores of as many first and second electric motors (EM1, EM2).

3. The system according to claim 2, wherein when said first (CA) and said second (CB) electric induction windings are wound on the same ferromagnetic core and when both said first and said second inverters are active, they are mutually synchronised in order to generate respective magnetic inductions that are isofrequential with the same phase between one another.

4. The system according to claim 3, wherein when said second set of windings is spatially phase-shifted with respect to said first set of windings, said second inverter is configured to compensate said spatial phase-shift by means of a time phase-shifting of the voltages and currents to obtain that respective magnetic inductions are isofrequential with the same phase between one another.

5. The system according to claim 2, wherein said single electric motor (M) or said first and said second electric motors (EM1, EM2) has/have a radial or axial flux, or
said single electric motor (M) or said first and said second electric motors (EM1, EM2) is/are separately excited synchronous motors or brushless DC motors.

6. The system according to claim 2, wherein said first set of magnetic induction windings have a number of phases different from a number of phases of said second set of magnetic induction windings.

7. A control method for a drive system according to claim 1 by means of a processing unit, the method comprising the steps of;
   (I) constantly activating said first inverter and activating said second inverter when a required power exceeds the predetermined threshold that is the fraction of a maximum power that can be delivered/received by said first battery pack, and
   (II) varying said threshold in order to obtain a predetermined ratio between charging states of said first and said second battery pack.

8. The method according to claim 7, wherein said first and said second steps are carried out both in the discharging phase and in the regenerative charging phase of said first and said second battery pack.

9. A computer program comprising program-coding means adapted to carry out the steps (I-II) according to claim 7, when said program is run on a computer.

10. Computer readable means comprising a stored program, said computer readable means comprising program-coding means adapted to carry out the steps (I-II) according to claim 7, when said program is run on a computer.

11. A composition method of said first (BA) and said second (BB) battery pack according to claim 1, comprising the following steps:
   acquiring a first target value CT of a total capacity given by the sum of the capacities of said first and said second battery packs;
   acquiring a second target value PT of a total deliverable power given by the sum of the powers deliverable by said first and by said second battery pack;
   acquiring a first capacity value C1 and a first power value P1 of a cell of said first plurality;
   acquiring a second capacity value C2 and a second power value P2 of a cell of said second plurality, wherein the first capacity value C1 is lower than the second capacity value C2;

calculating a first amount A of said first plurality and a second amount B of said second plurality according to the following system of two equations 1) and 2) in two unknowns A and B:

$$A*C1+B*C2=CT \qquad 1)$$

$$A*P1+B*P2=PT, \qquad 2)$$

wherein the first inverter is substantially always activated, whereas when the required electric power exceeds the first battery pack the second inverter driven by the second battery pack is activated to supplement the first inverter up to a maximum total deliverable power.

12. An electric or hybrid terrestrial vehicle comprising a first axle (A1) and a second axle (A2) and at least a drive system according to claim 1 associated with at least one of said first and second axles.

13. A hybrid vehicle according to claim 12, comprising an internal combustion engine (ICE) configured for driving a first axle (A1) into rotation by means of a first transmission and wherein a single electric motor (M) is operatively associated to said first transmission.

14. The hybrid vehicle according to claim 12, comprising an internal combustion engine (ICE) configured for driving a first axle (A1) into rotation by means of a first transmission and wherein a single electric motor is operatively associated to a second vehicle axle (A2) different from said first axle (A1).

15. The hybrid vehicle according to claim 12, comprising an internal combustion engine (ICE) configured for driving a first axle (A1) into rotation by means of a first transmission and wherein said two or more set of windings are wound on two independent ferromagnetic cores of as many first and second electric motors (EM1, EM2), wherein said first electric motor (EM1) is operatively associated to said first transmission and said second electric motor (EM2) is operatively associated to a second vehicle axle (A2) different from said first axle (A1).

* * * * *